United States Patent [19]

Amicel et al.

[11] 4,242,203
[45] Dec. 30, 1980

[54] HOLLOW FIBRE APPARATUS

[75] Inventors: Charles Amicel, Carrieres sur Seine; Bernard Biot, Craponne; Yves Butruille, Ferrol-Attilly; Christian Ollivier, Vienne, all of France

[73] Assignee: Sodip SA, Meyzieu, France

[21] Appl. No.: 865,100

[22] Filed: Dec. 27, 1977

[30] Foreign Application Priority Data

Dec. 24, 1976 [FR] France .................. 76 39695

[51] Int. Cl.³ .................................. B01D 31/00
[52] U.S. Cl. ..................... 210/321.1; 210/321.2; 210/321.3; 210/450; 210/456
[58] Field of Search ............ 210/456, 22, 321 A, 210/321 B, 321 R, 433 M, 450; 156/172, 173, 433

[56] References Cited

U.S. PATENT DOCUMENTS

| 3,228,876 | 1/1966 | Mahon | 210/22 |
| 3,616,929 | 11/1971 | Manjikian | 210/456 X |
| 3,755,034 | 8/1973 | Mahon et al. | 210/321 R X |
| 3,852,198 | 12/1974 | Murakami | 210/456 X |

FOREIGN PATENT DOCUMENTS 523699 11/1976 U.S.S.R. .................. 210/321 R

*Primary Examiner*—Frank A. Spear, Jr.
*Attorney, Agent, or Firm*—Gerald D. Sharkin; Robert S. Honor; Walter F. Jewell

[57] ABSTRACT

The invention concerns an improved hollow fibre apparatus for the fractionation of fluid, comprising;

a mandrel, sealing elements located at the ends of the mandrel and by which the hollow fibres are held, the fibres extending from one sealing element to the other, at least one of these sealing elements being traversed by the hollow fibres so that open ends of the fibres are exposed at an outer side of such sealing element, a casing, which is arranged at least around the hollow fibres and the sealing elements and defining a chamber between the inner wall of the casing, the opposing inner sides of the sealing elements and the mandrel, first inlet and/or outlet means for introducing and/or discharging of fluid through the inside of the hollow fibres, and second inlet and outlet means for introducing and discharging of fluid into the chamber outside the fibres, said second inlet and outlet means opening into and from the chamber at the periphery of the mandrel and adjacent the inner sides of each sealing element.

13 Claims, 10 Drawing Figures

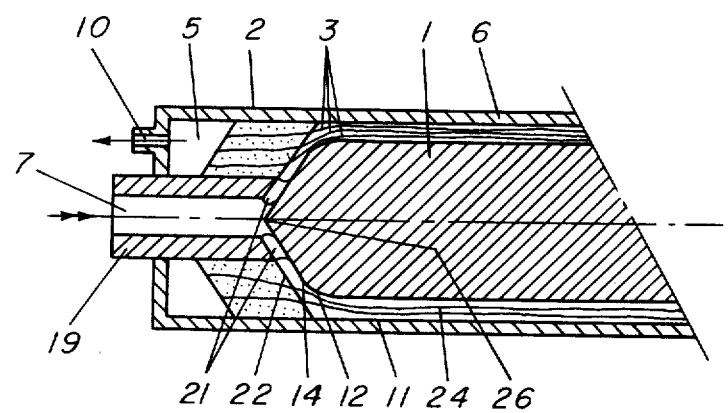
FIG. 4
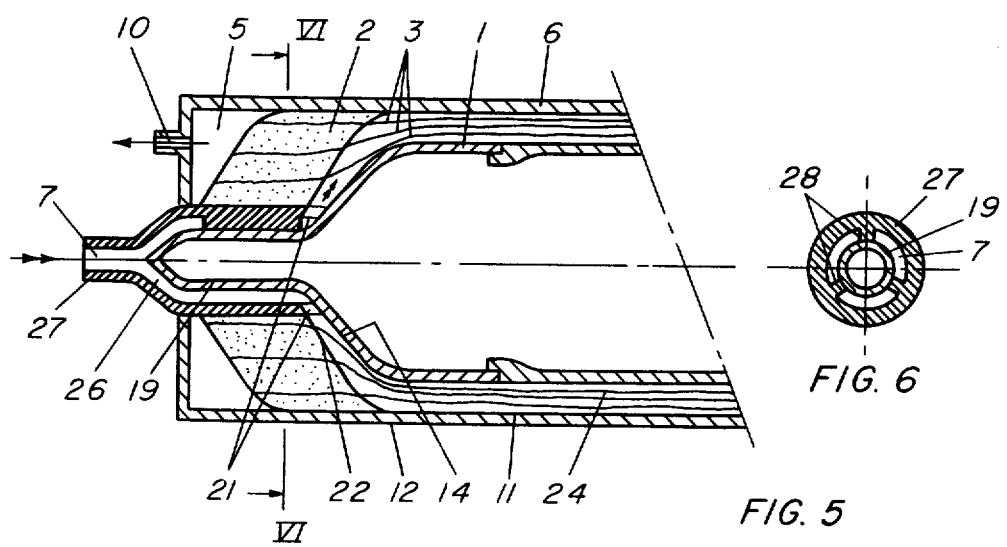
FIG. 5
FIG. 6

HOLLOW FIBRE APPARATUS

FIELD OF THE INVENTION

The present invention relates to a hollow fibre apparatus for the fractionation of fluids, especially for the treatment of blood. The fluid which circulates outside the fibres is introduced and/or withdrawn from a point near to inner-sides of sealing elements through which the hollow fibres pass. An object of the present invention is in general to provide an apparatus, in which a fluid can be circulated on the outer surfaces of the hollow fibres with low risks of dead or poorly irrigated regions being formed in use. More particularly, the apparatus according to the present invention relates to an apparatus which can be used for the treatment of blood, in which the latter may be circulated about the outer surfaces of the hollow fibres. The apparatus may be used as an artificial kidney for haemodialysis, as an artificial kidney for haemodialysis and ultrafiltration, as an artificial kidney for ultrafiltration alone, or as an artificial lung.

BACKGROUND OF THE INVENTION

The hollow fibre apparatus of the prior art, which can be used as an artificial kidney or an artificial lung and in which the fluid outside the fibres circulates from one sealing element to the other, are essentially apparatuses in which the blood circulates inside fibres which are essentially rectilinear and held together in a bundle inside a casing which is generally cylindrical in form. This requires that the sealing elements through which the fibres pass be cut with the greatest of care in order to ensure the passage of blood inside the fibres; in fact, the slightest surface roughnesses which may result from cutting of the sealing elements and the fibres, which can also lead to a flattening of fibre ends, will normally result in local coagulation of the blood. Such coagulation often spreads during the course of a haemodialysis session. Additionally, good haemocompatibility properties need to be possessed by the material of which the fibres and the sealing elements are made. Also, such must have good mechanical properties in order that cutting operations may be carried out to leave a smooth surface. In the apparatuses of the prior art in which blood is passed through the inside of hollow fibres, the inner wall of the fibres must possess a surface condition which is such that blood haemolysis or coagulation does not take place.

The apparatuses of the prior art are essentially designed for circulation of the blood inside the fibres, and means for introduction and/or withdrawal of fluid which is circulated outside the fibres are normally situated on the casing section surrounding the hollow fibres. If such apparatuses are used with blood circulating outside the fibres, regions will be poorly irrigated at least in the part which is diametrically opposite to the point of entry of blood in the chamber. Risks of coagulation will be significant in these parts.

One aim of the present invention is therefore to provide an apparatus which does not have the disadvantages of the apparatuses of the prior art and in which a fluid, especially blood, can be circulated about the outer surfaces of the hollow fibres, without risk of poor irrigation. An advantage of the apparatus according to the present invention resides in the fact that it suffices to cut the fibres without needs to achieve a perfect surface condition of their ends or of the sealing elements, since blood when circulated outside of the fibres would not come into contact with the cut surfaces. Another advantage of the apparatus of the present invention is that is makes it possible to use hollow fibres which may have a certain roughness or unevenness of the inside surface.

A further advantage of the apparatus according to the present invention resides also in the ease of cleaning of the circuit for the fluid which circulates outside the fibres.

SUMMARY OF THE INVENTION

A hollow fibre apparatus has now been found which can be used for the fractionation of fluid, especially for the treatment of blood with circulation of the latter outside the hollow fibres, and it is to this that the present invention especially relates. The apparatus is characterised in that it comprises, in combination with each other:

a mandrel, towards the ends of which two so-called sealing elements are situated, which surround the said mandrel and by which the hollow fibres are held, the fibres extending from one sealing element to the other, at least one of the two sealing elements being traversed by the hollow fibres so that open ends of the fibres are exposed at an outer side of such sealing element, a casing, which is arranged at least around the hollow fibres and the sealing elements, and defining, between its inner wall, the opposing inner sides of the sealing elements and the mandrel, a chamber in which the hollow fibres are arranged, first inlet and/or outlet means for introducing and/or discharging fluid through the inside of the hollow fibres, and second inlet and outlet means for introducing and discharging of fluid into the chamber outside the fibres, the said means opening into the chamber at the periphery of the mandrel and near to each sealing element.

The term "fractionation" as used herein encompasses any exchange or transfer of matter (or even of heat) by which, after said fractionation has taken place, a fluid is obtained which does not have the same composition or the same properties as the fluid which is introduced into the hollow fibres apparatus. The fractionation operations which are envisaged are therefore essentially:

exchange operations (dialysis, for example artificial kidney, direct osmosis, gas-gas exchange, gas-liquid exchange, for example artificial lung), separation operations (ultrafiltration, reverse osmosis, gas permeation), and mixing operations.

The hollow fibre apparatus according to the present invention can also be used in operations such as heat exchange between two fluids, humidification and/or conditioning of air, dissolution of certain gases in liquids, and the like.

The hollow fibres which can be employed in the apparatus of the present invention may be of any known type and may be made of any natural, artificial, or synthetic macromolecular material. In particular, fibres such as described in French Pat. Nos. 1,307,979, 1,586,563, 2,017,387 and U.S. Pat. No. 3,674,628 can be employed. These fibres can be obtained by a melting process, by a dry process (evaporation of solvent) or by a wet process (coagulation). The precise nature of the hollow fibres is chosen dependently of the application which is envisaged. For operations of simple heat exchange, the hollow fibres used would be impermeable to the fluids which are circulated and could for example be of materials such as described in U.S. Pat. No. 3,315,740.

Hollow fibres which can be used to advantage in the apparatus of the present invention generally have an external diameter which is less than 1.5 mm, preferably less than 0.75 mm and generally greater than 5 microns. When the apparatus is for use as a haemodialyser or an artificial lung, the external diameter of the fibres is preferably greater than 300 microns. The thickness of the wall of the fibres is generally between 1 and 100 microns.

Apparatus in accordance with the present invention will be better understood with reference to the accompanying drawings which illustrate, by way of example, some particular embodiments of the said apparatus.

BRIEF DESCRIPTION OF THE DRAWINGS

FIGS. 3, 4 and 5 show partial longitudinal cross-sections of embodiments of the apparatus of the invention.

FIG. 6 is a partial cross-section along VI—VI in FIG. 5 or along VI—VI in FIG. 7.

DETAILED DESCRIPTION

Figure 2:
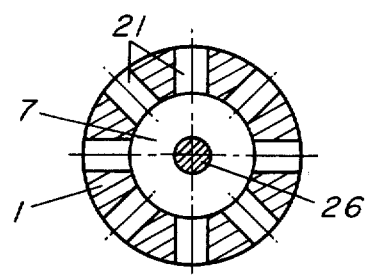
FIG. 2 is a partial cross-section along II—II in FIG. 1.
Figure 1:
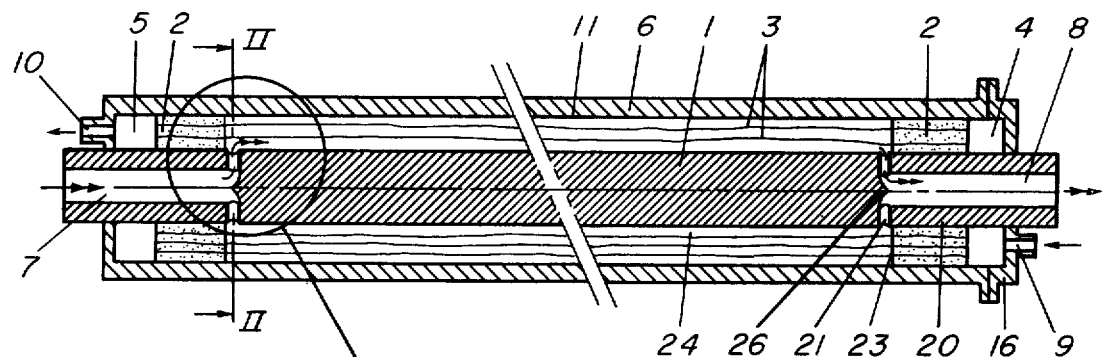
FIG. 1 shows a cross-section of an apparatus according to the present invention along its longitudinal axis.
Figure 8:
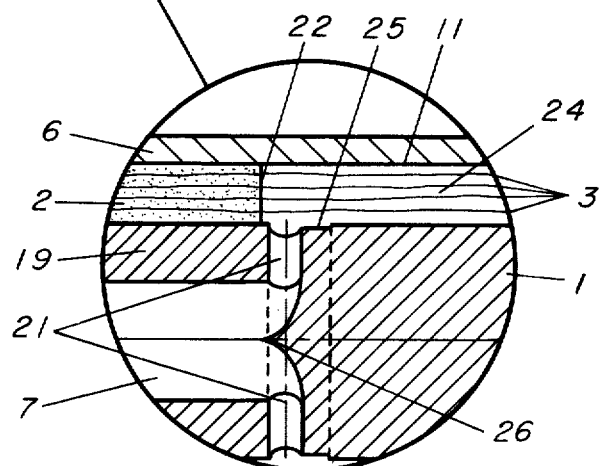
FIG. 8 is an enlargement of the encircled portion of FIG. 1.

The apparatus according to FIG. 1 comprises a cylindrical mandrel (1), which is advantageously of circular cross-section, and two leak-proof sealing elements (2) in which terminal regions of the fibres (3) are embedded. The fibres extend from one sealing element to the other, the sealing elements (2) being situated near the ends (19) and (20) of the mandrel (1). These leak-proof sealing elements (2) generally comrpise some solidified glue, which is based, for example, on silicone resin or polyurethane, and can additionally comprise threads or ribbons which are wound around the mandrel (1), between the turns of which the fibres are arranged and held by the solidified glue in such a way as to be leak-proof. Between the two sealing elements (2) the fibres (3) are generally in contact with each other and they can advantageously be arranged in the form of torsades, which are placed next to each other, in a fashion similar to that described in French Pat. Nos. 73/20,040 and 74/11,674. Each torsade of hollow fibres preferentially comprises two fibres or itself comprises two torsades of two fibres which are wound around each other. However, the hollow fibres (3) can be arranged around the mandrel in an essentially rectilinear manner and parallel to each other. In this case, it can be advantageous to arrange threads or ribbons between the fibres as is described, for example, in U.S. Pat. No. 3,277,959 (see FIG. 11 especially). Each end of the fibres (3) is open and opens out into an enclosure or compartment (4) or (5) which comprises means (9,10) for the introduction or the withdrawal of a fluid being passed through the hollow fibres (3). Around the hollow fibres (3), and preferably in contact with them, a casing (6) is situated, which comprises at one of its ends means which form the compartment (5), and at the other end, a cheek (16) which delimits the compartment (4). The inner wall (11) of the casing (6), the mandrel (1) and the faces (22,23) of the end walls (2), which are opposite each other, define a chamber (24) of annular cross-section inside which the hollow fibres (3) are situated. The characteristic of the apparatus according to the present invention lies in the fact that it comprises inlet or outlet means which open out into the chamber (24) adjacent the inner side of each sealing element (2). Fluid may thus be distributed around the mandrel (1). The inlet or outlet means are used to introduce and withdraw the fluid which is circulated outside the hollow fibres (3) inside the chamber (24) and comprises passages or canals (21) which are linked to a distribution system or neck (7) or (8) inside the mandrel (1) towards its ends (19) and (20). FIG. 2 shows more precisely a method of distribution of the canals (21) around the mandrel (1). FIG. 8, which is an enlargement of the circled part of the mandrel (1) in FIG. 1, shows, as a variant, how the canals (21) can advantageously open out onto the mandrel (1) and into a throat (25), which is provided around the latter, and how the distribution system (7) advantageously contains means (26) of preventing the fluid which is introduced from coming perpendicularly into contact with the mandrel at the bottom of the said distribution system (7).

When using the apparatus according to FIG. 1, for example as a haemodialyser, the blood is caused to arrive in the apparatus through the distribution system or neck (7). It then passes through the canals (21) and circulates outside the hollow fibres (3) from the inner face (22) of the sealing element (2), which is situated on the left of the apparatus, up to the inner face (23) of the sealing element (2), which is on the right of the apparatus, through the canals (21) and into the collection system (8), and it then leaves the apparatus. The dialysis liquid, which circulates inside the hollow fibres (3), enters the apparatus through the inlet neck (9), passes into the distribution compartment (4) and into the hollow fibres (3), leaves again at the other end of the latter (3) into the collection compartment (5), and then leaves the apparatus through the outlet neck (10). It must however be pointed out that fluid which circulates outside the fibres can be introduced into the apparatus through the neck (8) and leave again through the neck (7). In the same way, the fluid which circulates inside the fibres can be introduced into the apparatus through the neck (10) in order to leave the apparatus again through the neck (9). By convention, which is preserved throughout the description and in each drawing of the present application, the arrows near each distribution system or neck of the apparatuses represented have two chevrons when they indicate the direction of circulation of the fluid outside the hollow fibres, whereas these arrows have one chevron when they indicate the direction of circulation of a fluid inside the fibres.

Figure 3:
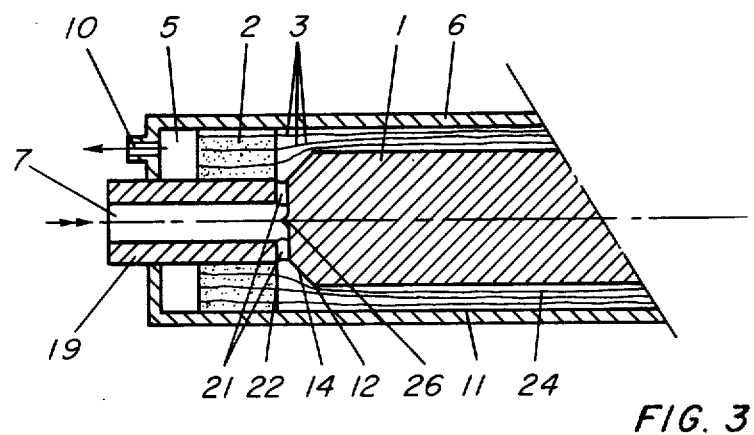

FIG. 3 represents a partial cross-section along the longitudinal axis of an apparatus in which the mandrel (1), which is advantageously cylindrical, has a transverse cross-section which is larger, for the greater part of its length between the leak-proof sealing elements (2), than the cross-section of its ends (19) and (20, not shown) which are surrounded by sealing elements (2) of annular cross-section. Thus, in the apparatus according to FIG. 3, of which only one part is shown and of which the other part is similar to that which is shown (but with a cheek 16, like the apparatus according to FIG. 1), the cylindrical mandrel (1) has a diameter which is greater, between the point represented by (12) and its homologue on the part which is not represented, than the diameters of the ends (19) and (20) of equivalent cross-section which are surrounded by the sealing elements (2). The canals (21) open out on to the mandrel (1) near to or at the beginning of the region represented by (14) (and in the region equivalent to the part of the apparatus which is not shown) where the cross-section of the mandrel (1) is increasing between the end (19), which is surrounded by the sealing element (2), and the point represented by (12) on the mandrel corresponding to the part having the larger cross-section. The canals (21) preferably open out onto the mandrel (1) just before the cross-section of the mandrel changes, in order to join up to its part of larger diameter (or of larger cross-section).

In the embodiment of the apparatus according to FIG. 3, the fibres (3) are advantageously arranged in the form of torsades, which are placed next to each other and are in contact with each other, whereas each of the sealing elements (2) advantageously comprise a band which is wound as a spiral around the ends (19 and 20) of the mandrel (1), the fibres being arranged between the turns of the band. The sealing elements (2) may be sealed by means of a glue.

The advantage of the apparatus according to FIG. 3 in relation to the apparatus according to FIG. 1 lies essentially in the improved distribution of the fluid being circulated outside the fibres (3) towards the canals (21); this results:

on the one hand from the presence of the ribbon of the sealing element, which holds the fibres at a certain distance from each other on both sides of the ribbon (by virtue of its thickness) whereas in the part of the chamber (24) along the part of the mandrel of greater cross-section, the fibres are all in contact with each other, and on the other hand from the fact that the fibres (3) become progressively further apart from each other from the sealing element (2) up to the region represented by (12) on the mandrel (1), by virtue of the differences in cross-section between the means which support the sealing elements (2) and the region of the mandrel (1) which is represented by (12).

The apparatus according to FIG. 4 resembles that according to FIG. 3, but with the difference that the opposite faces, (22) and (23, not represented), of the sealing elements (2) are not perpendicular to the longitudinal axis of the mandrel (1), but are inclined with respect thereto. The intersection of a plane which contains the longitudinal axis of the mandrel, with the inner face (22 or 23) at the chamber (24) of each sealing element (2), is represented by two segments of straight lines which are arranged symmetrically in relation to the axis of the mandrel (1). These segments of straight lines can be considered as forming an acute angle with the longitudinal axis of the mandrel, when measuring this angle from the side of the chamber (24). This angle is generally between 20 and 88 degrees and advantageously between 30 and 70 degrees. Thus, in the apparatus according to FIG. 4, the faces (22) and (23) of each sealing element (2), which are exposed on the inner side of the chamber (24), are inclined in relation to the longitudinal axis of the mandrel and their inclination is approximately the same in any plane, which contains the longitudinal axis of the mandrel, for any point of each face which is equidistant from this longitudinal axis, in the case where the transverse cross-section of the means supporting the walls is circular, or in a more general case, equidistant from the means supporting the sealing elements. In order to simplify the drawing, only the part on the left of the apparatus has been represented in FIG. 4, but the part on the right is essentially identical to that represented (but with a cheek 16) and is approximately symmetrical to the latter in relation to a plane which is perpendicular to the longitudinal axis of the mandrel. However, the opposite faces of each sealing element can have a profile which is different from one element to the other. In the apparatus according to FIG. 4, the axis of the canals (21) is also preferably oblique in relation to the longitudinal axis of the mandrel. This embodiment favours the flow of fluid which is circulated outside the hollow fibres as it enters the chamber (24) or as it leaves the said chamber; it is thus virtually impossible for such fluid to come into contact perpendicularly with structural elements of the apparatus. As is represented in the apparatus according to FIG. 4, the profile of the face (22) of the sealing element (2) is advantageously complimentary with of the region (14) of the mandrel, and the same applies to the other sealing element which is not shown in FIG. 4. The fact that the apparatus possesses inclined faces (22,23) for its sealing elements (2) furthermore has the advantage of reducing insofar as possible the volume of fluid, for example blood, which is circulated outside the fibres (3) in the chamber (24).

It should be noted, for a cross-section of the apparatus along a plane which passes through the longitudinal axis of the mandrel, that the inner face at the chamber (24) of sealing element (2) is not necessarily represented by two segments of straight lines and that, in certain cases, this intersection can be represented by two sections of curves as is the case for the apparatus according to FIG. 5. The inner face (22) of the sealing element represented in FIG. 5, as the distance from the component (27) supporting the said element increases, can be considered to initially make a constant angle with the axis of the mandrel and then to become progressively less inclined near the inner wall (11) of the casing (6). However, by way of a variant, this face (22) can become constantly less inclined, this reduction being, for example, more accentuated towards the inner wall of the casing. The apparatus according to FIG. 5 is shown equipped with a hollow mandrel (1), by way of a variant of the mandrels represented in the preceding figures. This mandrel (1) according to FIG. 5 possesses, as does that in FIG. 4, ends (19 and 20) which have a smaller cross-section than the cross-section of the major part of the mandrel between the sealing elements (2), and each distribution system 7 (or 8, not shown at the other end of the mandrel) is obtained by means of an applied component (27) which is arranged around each end (19) and (20) of the mandrel and around which each sealing element (2) is mounted in such a way as to be leak-proof. An applied component (27) is represented in transverse cross-section in FIG. 6 and advantageously comprises inner longitudinal ribs (28) resting on the end (19) of the mandrel, between which ribs the fluid which circulates outside the hollow fibres (3) passes, this fluid entering or leaving the chamber (24) by means of the passages (21).

Figure 7:
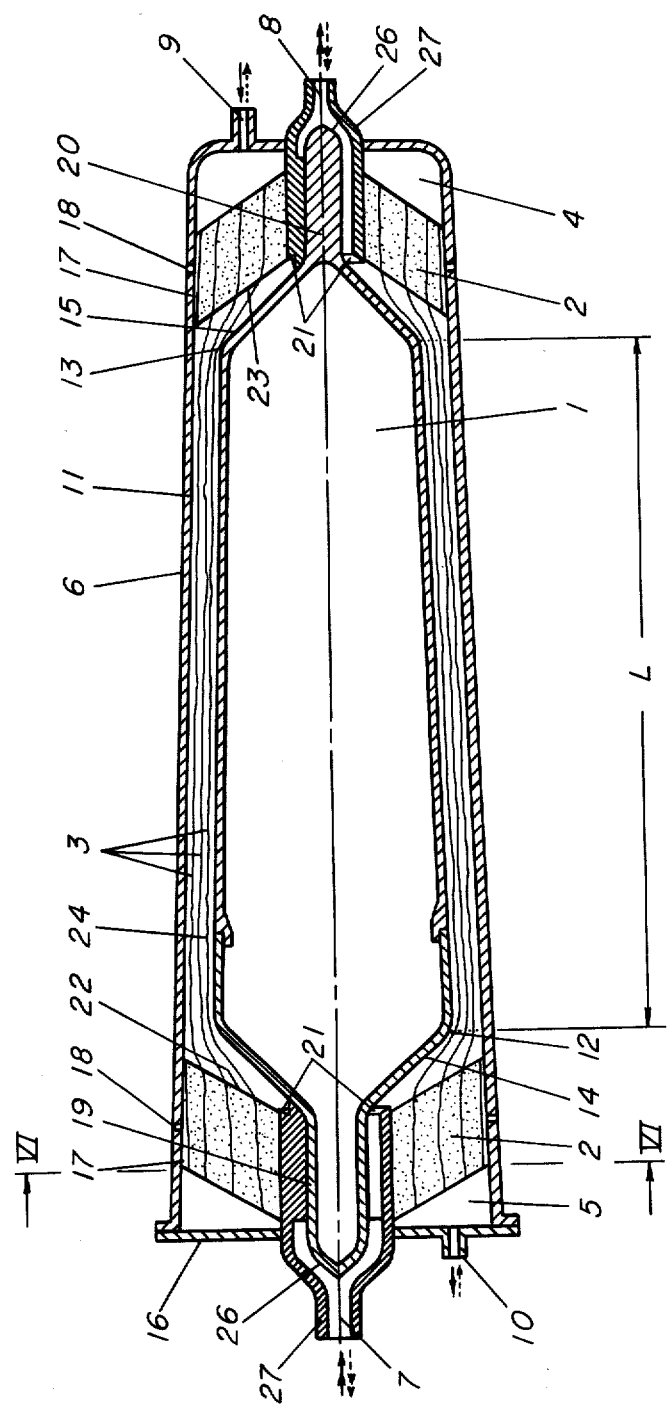
FIG. 7 shows a longitudinal cross-section of a preferred embodiment of an apparatus according to present invention.

FIG. 7 represents a preferential embodiment of an apparatus according to the present invention which, like the preceding apparatuses, comprises a mandrel and in which the fluid which circulates outside the hollow fibres (3) is introduced into (or discharged from) the chamber (24) near each sealing element (2), towards its part of smaller cross-section. This apparatus according to FIG. 7 advantageously comprises sealing elements (2), of which the opposite faces (22) and (23) are inclined in relation to the axis of the mandrel, as is the case for the previously described apparatuses according to FIGS. 4 and 5. However, it possesses the structural difference of having a mandrel (1), which is in the form of a truncated cone along the greater part of its length between the two sealing elements (2), and of having a casing (6), of which the inner wall (11) is also in the form of a truncated cone at least in its part which is opposite to the part of the mandrel which is in the form of a truncated cone. The mandrel (1) is thus in the form of a truncated cone in its part L between the points represented by (12) and (13) and, in the case of the apparatus represented in FIG. 7, the inner wall (11) of the casing (6) is in the form of a truncated cone over its whole length. The conicities of the mandrel (1) and of the inner wall (11) of the casing are advantageously different (that of the inner wall (11) of the casing (6) being smaller than that of the mandrel (1)) and they are such that the transverse cross-section of the chamber (24) is essentially the same along the whole of the part L of the mandrel. The conicity of the mandrel (angle of the vertex) is advantageously between 2 and 15 degrees and preferably between 4 and 10 degrees. By way of example, a hollow fibre apparatus according to FIG. 7 has been produced with a conicity of the mandrel of 6 degrees 40 minutes along the length L, which is in the form of a truncated cone, of 144 mm, the conicity of the inner wall of the casing being 5 degrees 9 minutes.

In an apparatus according to FIG. 7, the means of supporting the sealing elements, which comprise applied components (27), are advantageously of different cross-section from each other. Thus, in the apparatus according to FIG. 7, the cross-section of the applied component (27), which supports the end wall (2) near the end (12) of the part L, which is in the form of a truncated cone, of the mandrel of larger cross-section, has a larger cross-section than that of the corresponding component (27) near the end (13) of the part L, which is in the form of a truncated cone, of the mandrel of smaller cross-section. On the other hand, especially in the case of an apparatus which is short or/and in the case where the sealing elements (2) have a relatively large cross-section, the means, which support the sealing element near the part L of the mandrel, which is in the form of a truncated cone, and of greater cross-section (part represented by 12), can have a cross-section which is smaller than the part, which is in the form of a truncated cone, of the mandrel of smaller cross-section (part represented by 13), as is the case for the apparatus represented in FIG. 7. In order to complete the seal between the inner wall (11) of the casing (6) and the peripheral part of each sealing element (2), injections (17) of glue have been carried out through openings (18), which are advantageously provided in the casing (6) around the latter. The apparatus according to FIG. 7 has the advantage (with respect to the previously described apparatuses), other than that of having a chamber (24) in which the hollow fibres (3) are regularly spaced and can be tightened together in a controlled manner by the inner wall (11) of the casing (6) (this eliminating as far as possible the preferential routes of the fluid which is circulated outside the fibres), of being simple to construct as far as the positioning of the casing (6) around the fibres (3) is concerned. In fact, this casing (6) which is advantageously produced in a single piece, for example by moulding (which avoids having to produce seals on its generatrices as is the case when two half-shells are arranged around a bundle of hollow fibres), is placed around the assembly mandrel + hollow fibres + end walls by introducing the part of the casing (6), of which the inner wall (11) is of greater cross-section, around the end of the mandrel, of which the sealing element (2) is of smaller cross-section (or vice versa). By virtue of the relative conicities of the mandrel (1) in its part L and of the inner wall (11) of the casing (6) all the points of the inner wall (11) of the casing (6), slide into contact with the fibres (3) only over a very small part of their length, when the casing is positioned around the assembly mandrel + hollow fibres + end walls. The apparatus according to FIG. 7 thus makes it possible to tighten the fibres regularly and in a controlled manner without risk of damaging them. This makes it possible to render the apparatus more efficient by means of exchanges which are improved by virtue of the thinness of the layer of fluid which circulates outside the fibres.

Figure 9:
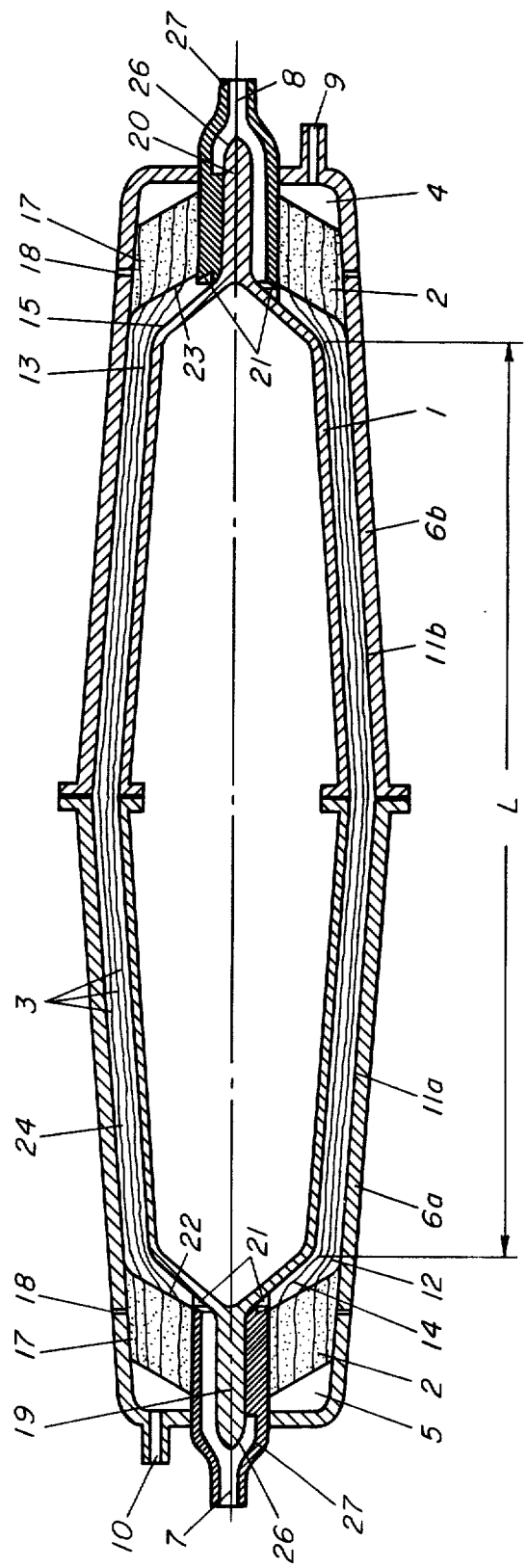
FIG. 9 shows a longitudinal cross-section of a further embodiment of an apparatus according to the invention.

FIG. 9 represents an embodiment of an apparatus according to the present invention, which has the particular characteristic of having a mandrel (1) which is in the form of a double truncated cone over the greater part L of its length between the two sealing elements (2) and of having a casing in two sections (6a) and (6b), of which the inner wall (11a) and (11b) of each of them is in the form of a truncated cone at least along its length which is opposite to the part of the mandrel which is in the form of a truncated cone.

The two sections (6a) and (6b) of the casing are joined together in such a way as to be leak-proof in a plane which is perpendicular to the longitudinal axis of the mandrel. In relation to the previously described apparatus according to FIG. 7, this apparatus has the additional advantage that it can be symmetrical in relation to a plane, which is perpendicular to the longitudinal axis of the mandrel, and this can make it possible, for example, to reduce the number of moulds for injection moulded components.

Numerous variants of the apparatuses which have been described and are represented in FIGS. 1 to 8, will be readily apparent to those skilled in the art. It is possible, for example, for the mandrel not to be of transverse circular cross-section. However, when the mandrel is not of circular cross-section, it is advantageous that the ends of the mandrel which support the sealing elements have a cross-section which has the the same form (homothetic) as that of the mandrel, in the same way as the inner wall (11) of the casing (6).

It should also be noted that, when an apparatus according to the present invention is used only for separation operations (for example reverse osmosis, ultrafiltration, especially kidney for ultrafiltration alone) and when the fluid to be treated is circulated about the outer walls of the fibres, this apparatus does not require the presence of two collection chambers or compartments for the withdrawal of the fluid. The hollow fibres can in fact be arranged in the form of a U between the two sealing elements (2) and only the sealing element which carries the open ends of the fibres requires a compartment for the collection and/or the discharge of the fluid which has transversed the hollow fibres (3). In the apparatus above, it is also not necessary that both of the sealing elements (2) be leak-proof. Only the sealing element which carries the open ends of the fibres need to be leak-proof.

Figure 10:
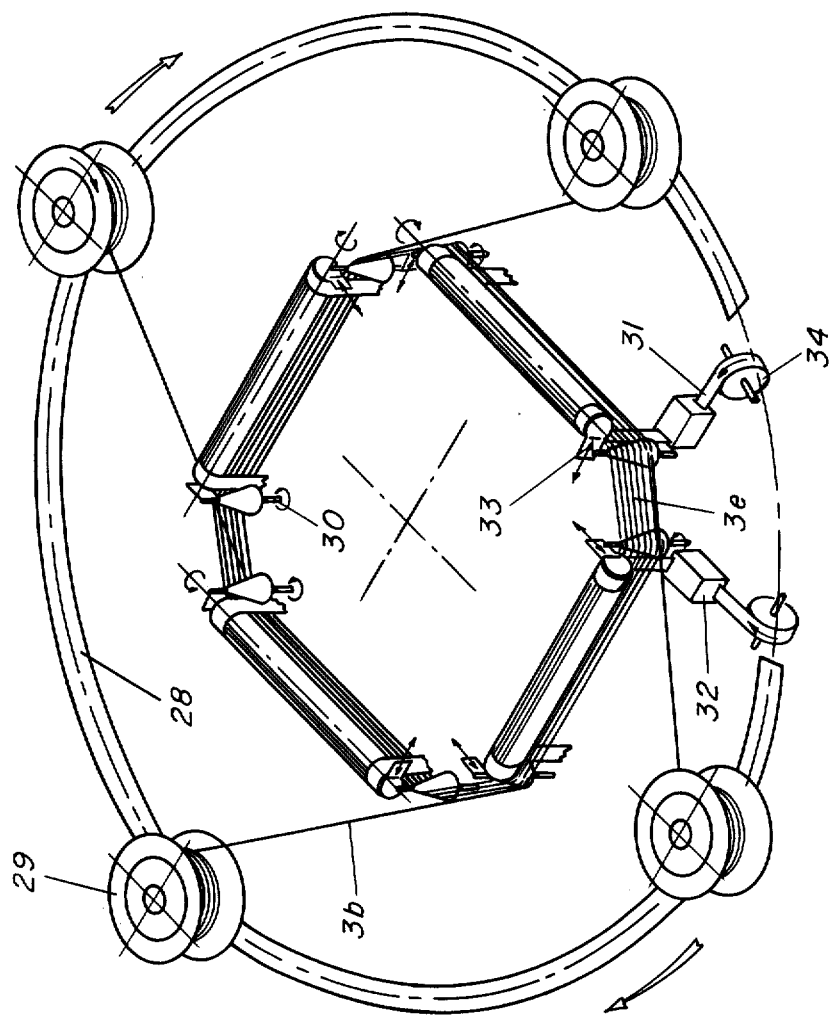
FIG. 10 shows a schematic view of equipment which may be employed for producing apparatus according to the invention.

The hollow fibre apparatuses according to the present invention can be produced by means of the equipment which is shown in FIG. 10. The latter comprises a device for winding at least one hollow fibre (3b) around means which make it possible to obtain an envelope (3e) of polygonal cross-section with this fibre. This device comprises a frame (28), which rotates around its axis, with spools (29) of hollow fibres (3b). In order to simplify the drawing, the thread guides of the spools and the means of entraining this frame (28) have not been shown. Each spool (29) has at least one hollow fibre (3b) and can optionally have several; in the latter case the fibres are then advantageously in the form of torsades. The frame (28) has been shown with four spools (29) but it can have only one or two. The means which make it possible to obtain an envelope (3e) of polygonal cross-section with the fibres (3a) comprise rods (30) which are at least partially threaded and arranged at each end of mandrels (1) and on the threaded part of which the hollow fibres (3b) are deposited. These rods (30) can themselves rotate about their longitudinal axis by virtue of means of entraining which are not shown. The rods (30) advantageously have a profile which makes it possible for the fibres in the envelope of polygonal cross-section to slacken in the course of their forward movement onto the said rods (30), thus avoiding a subsequent contraction of the hollow fibres. In addition, the rods (30) can have a profile such that the envelope (3e) of hollow fibres can take up the longitudinal profile of each mandrel, when the envelope comes into contact with each mandrel (1) (in the case where the mandrels have a shape corresponding to that of the apparatuses in FIGS. 3, 4, 5, 7 and 9). The equipment according to FIG. 10 comprises eight threaded rods (30) and four mandrels (1) which are represented in the situation when the desired number of hollow fibres around each one of them has almost been reached. The longitudinal axes of the mandrels (1) are in the same plane, which is perpendicular to the axis of rotation of the frame (28). The apparatus according to FIG. 10 comprises means of holding the envelope (3e) of hollow fibres before cutting. These means are ribbons (31) which are arranged towards each end of the mandrel, covered with adhesive at least over a part of their width by passing them through glue distributing troughs (32) and are wound around the mandrels (1). In order to maintain essentially the same point of contact between the ribbons (31) and the mandrels (1), which rotate about their longitudinal axis while being covered with lengths of hollow fibres (3) (as will be described in more detail below), the apparatus can comprise means, which are not shown, either of increasing the distance in a controlled manner of each mandrel (1) from the rods (30) which are then fixed, or, on the other hand, of increasing the distance in a controlled manner of the rods (30) from the mandrels (1), which are then fixed.

The equipment according to FIG. 10 comprises means (33) of cutting the envelope (3e) of hollow fibres whilst the envelope is held on the mandrel (1) by the ribbons (31). These means (33) of cutting are advantageously situated near the point of contact of the ribbons (31) with the mandrel and towards each end of the mandrels (1). These means of cutting or sectioning (33) of the envelope can, for example, consist of rotating circular blades.

When the hollow fibre apparatuses which are produced correspond to those of FIGS. 4, 5, 7 or 9, the equipment according to FIG. 10 comprises means, which are not shown, of displacing, in a controlled manner, the spools (34) of ribbons (31), the ribbons (31) and the glue distributing troughs (32) towards the central part (in relation to its length) of each mandrel (1). In this case, the means (33) of sectioning the envelope can be displaced in the same direction and in the same movement as that of the ribbons (31).

The operation of the equipment represented in FIG. 10 is carried out in the following manner:

after passage through glue distributing troughs (32) each ribbon (31) is attached to one end of a mandrel (1);

the end of each fibre 3b, which has wound off from a spool (29) is attached to a fixed point on the apparatus after having passed it into a thread guide (the latter, as well as the fixed point, not being shown);

the mandrels (1), the frame (28) and the rods (30) are caused to rotate about their axes and the means (33) of cutting the envelope are put into operation. If the apparatuses which are being produced have end walls which are inclined, as those of the apparatuses in FIGS. 4, 5, 7 and 9, the means which make it possible to displace the bands (31) towards the central part of each mandrel (in relation to its length) are set in motion and, optionally, the means which make it possible to displace the cutting means (33) are set in motion;

when the envelope (3e) of hollow fibres comes into contact with the cutting means (33), four groups of lengths of hollow fibres (3) are obtained, each of which is wound around the corresponding mandrel; and the ribbons (31) are cut when the thickness (or the number) of hollow fibres around the mandrels (1) is judged to be sufficient. After having removed the mandrels (1) which are surrounded by hollow fibres (3), the operation can be recommended with other mandrels.

The equipment according to FIG. 10 makes it possible to vary the rotation speeds of the frame (28), the rods (30) and the mandrels (1) at will and independently of each other. This is particularly important and advantageous, especially at the end of winding the lengths of hollow fibres (3) around the mandrel (1). It is thus possible to reduce the rotation speeds of the frame (28) and the rods (30) and to increase the rotation speed of the mandrels (1) in order to terminate the winding with a few turns of ribbons (31) without lengths of fibres (3). This apparatus is also easily adapted to extensive automation with the possibility of programming the rotation speeds of the frame (28), the rods (30) and the mandrels (1), it even being possible to carry out the changing of the mandrel automatically.

Numerous variants of the equipment described above and represented in FIG. 10 will be apparent to those skilled in the art. Instead of comprising one threaded rod (30) at each end of each mandrel (1), the equipment can comprise only one rod (30) between two consecutive mandrels (1).

It is also possible to wind around each mandrel (1), between the ribbons (31) of the end walls, spacer threads or ribbons which are spaced apart from each other with the aim of ensuring a better circulation and distribution of the fluid which is to circulate outside the lengths of hollow fibres (3), especially when the fibres (3) are not in the form of torsades.

By way of a variant, it is possible to use threaded rods (30), which are positioned as those in the equipment according to FIG. 10 but are cylindrical over their whole length, and to provide a device or "extension ramp", which is positioned between each group of two adjacent consecutive rods (30). This extension ramp has a profile which is chosen so as to make it possible for the fibres of the polygonal envelope (3e) to slacken in the course of their forward movement onto the threaded rods and onto the said extension ramps, and to make it possible for the fibres of the polygonal envelope (3e) to take up the profile of the mandrels (1) when they come into contact with them.

When it is desired to obtain a hollow fibre apparatus according to the present invention with the fibres arranged in the form of a U along the mandrel (1), it is possible to use equipment which is not shown but which has all the essential elements of the equipment in FIG. 10. This equipment therefore comprises only two threaded rods (30) around which the fibres (3b), which come from the spools (29), are deposited, the envelope of fibres which is thus obtained is then wound around a mandrel (1), the ribbons (31) being situated, for example, inside the envelope of fibres. The fibres are then cut only at one sealing element and this sectioning can be carried out when the fibres are being wound around the mandrel (or afterwards).

What is claimed is:

1. Hollow fiber apparatus for the fractionation of fluid comprising; a mandrel, sealing elements located about end sections of the mandrel and by which the hollow fibers are held, the fibers extending from one sealing element to the other, at least one of these sealing elements being traversed by the hollow fibers so that open ends of the fibers are exposed at an outer side of such sealing element, each sealing element comprising a ribbon wound around the mandrel, the hollow fibers being secured between spirals of the ribbon by means of a sealing agent;
    a casting, which is arranged at least around the hollow fibers and the sealing elements and defining a chamber between the inner wall of the casing, the opposing inner sides of the sealing elements and the mandrel; the mandrel in the chamber having a cross section greater near the inner wall of each sealing element than at the place where is situated the adjacent sealing element, the cross-section of the mandrel increasing progressively in each of the two so defined regions,
    first inlet and outlet means for introducing and discharging of fluid through the inside of the hollow fibers,
    and second inlet and outlet means for introducing and discharging of fluid into the chamber outside of the fibers,
    said second inlet and outlet means opening into and from the chamber at the periphery of the mandrel, essentially adjacent the inner sides of each sealing element where the cross-section of the mandrel progressively increases, the inner side of each sealing element being inclined in relation to the longitudinal axis of the mandrel, the inclination being substantially the same relative to any plane which contains the longitudinal axis of the mandrel for any point on each face which is equidistant from the longitudinal axis of the mandrel.

2. Apparatus according to claim 1, in which the second inlet and outlet means for introducing and discharging of fluid which is circulated outside the fibres comprise,
    at each end of the mandrel, a distributer system which is substantially parallel to the longitudinal axis of the mandrel, and comprising canals which are distributed about the mandrel and open into the chamber adjacent the inner sides of each sealing element.

3. Apparatus according to claim 1, in which the second inlet and outlet means comprises, at each end of the mandrel, an applied component around which the sealing element is mounted.

4. Apparatus according to claim 3, in which each applied component defines, in conjunction with the mandrel, passages which open into the chamber.

5. Apparatus according to claim 1, in which support means for supporting the sealing elements are provided and which have a cross-section which is smaller than the cross-section of the mandrel along the greater part of its length between the opposing inner sides of each sealing element.

6. Apparatus according to claim 1, in which the mandrel is in the form of truncated cone along the greater part of its length between the two sealing elements and in which the inner wall of the casing is also in the form of truncated cone at least in that part which encases the truncated cone-shaped section of the mandrel.

7. Apparatus according to claim 6, in which the conicities of the mandrel and of the inner wall of the casing are different and are such that the transverse cross-section of the chamber is essentially constant over the length of the truncated cone-shaped section of the mandrel.

8. Apparatus according to claim 6, in which support means for supporting the sealing elements are provided, which support means have transverse cross-sections which are different from one another.

9. Apparatus according to claim 1, characterised in that its comprises, in combination,
    an elongated mandrel towards the ends of which two sealing elements are situated, which sealing elements are each supported by an applied component, the said mandrel being in the form of a truncated cone along the greater part of its length between the two sealing elements, the mandrel having a cross-section which is greater towards each end of its truncated cone-shaped section than the cross-section of the adjacent applied component, the applied components each having cross-sections which are different from each other,
    hollow fibres which are arranged in the shape of torsades, which are placed next to and in contact with one another, the said fibres extending between the two sealing elements of which opposing inner sides are inclined in relation to the longitudinal axis of the mandrel,
    a casing which is arranged at least around the hollow fibres and the periphery of the sealing elements, the said casing having its inner wall in the form of a truncated cone at least in that part which encases the truncated cone-shaped section of the mandrel, the inner wall of the casing, the opposing inner sides of the sealing elements and the mandrel defining a chamber in which the hollow fibres are arranged,
    first inlet and outlet means for introducing and the discharging of fluid through the hollow fibres, and
    second inlet and outlet means for introducing and discharging of fluid into the chamber outside the fibres, the said second inlet and outlet means opening into the chamber at the periphery of the mandrel and adjacent opposing inner sides of the sealing elements.

10. Apparatus according to claim 1, in which the mandrel is in the form of a double truncated cone over the greater part of its length between the two sealing elements and in which the casing comprises two elements, the inner walls of which are in the form of truncated cones so as also to be in the form of a double truncated cone, at least in that part which encases the double truncated cone-shaped section of the mandrel.

11. A hollow fiber apparatus for the fractionation of a fluid, comprising an elongated mandrel, longitudinally spaced sealing elements located about two end sections of the mandrel and defining longitudinally spaced inner and outer sides, the inner side of each sealing element being inclined in relation to the longitudinal axis of the mandrel, a plurality of semipermeable hollow fibers arranged about the mandrel and passing seallingly through the longitudinally spaced sealing elements so that open ends of the hollow fibers are exposed at the longitudinally spaced outer sides of the sealing elements, a housing comprising an elongated section enclosing the hollow fibers with the sealing elements sealing against the inside wall of the elongated sections of the housing, whereby a fluid flow chamber comprising the hollow fibers is defined between the longitudinally spaced inner sides of the sealing elements and the outer surface of the mandrel, the housing additionally comprising end sections enclosing the outer sides of the longitudinally spaced sealing elements, each sealing element comprising a ribbon wound around the mandrel, the hollow fibers being secured between spirals of the ribbon by means of a sealing agent;

the mandrel in the chamber having a cross-section greater near the inner wall of each sealing element than at the place where is situated the adjacent sealing element, the cross-section of the mandrel increasing progressively in each of the two so defined regions, whereby a fluid distribution enclosure and a fluid collection enclosure communicating with the open ends of the hollow fibers are defined between the longitudinally spaced outer surfaces of the sealing elements and end sections of the housing, a first fluid inlet leading into the fluid distribution enclosure and a first fluid outlet leading from the fluid collection enclosure, whereby a fluid may be passed through the inside of the hollow fibers, a second fluid inlet leading into the fluid flow chamber and a second fluid outlet leading from such chamber, each of said second fluid inlet and second fluid outlet communicating with the fluid flow chamber via a conduit leading through an end section of the housing and through a sealing element and opening into the fluid flow chamber adjacent an inner side of a sealing element where the cross-section of the mandrel progressively increases, whereby a fluid may be passed through the fluid chamber about the outer surfaces of the hollow fibers and the mandrel.

12. A hollow fibre apparatus according to claim 11, in which the conduit leading through an end section of the housing and through a sealing element opens into the fluid flow chamber through a fluid distribution system defined between an inner side of a sealing element and an end face of the mandrel.

13. A hollow fibre apparatus according to claim 12, in which the fluid distribution system comprises a series of channels radiating outwardly from conduit and into the fluid flow chamber adjacent an inner side of a sealing element.

* * * * *